Sept. 26, 1967    C. W. BERTO ETAL    3,343,250
MULTIPLE TUBE FORMING METHOD
Filed April 22, 1964
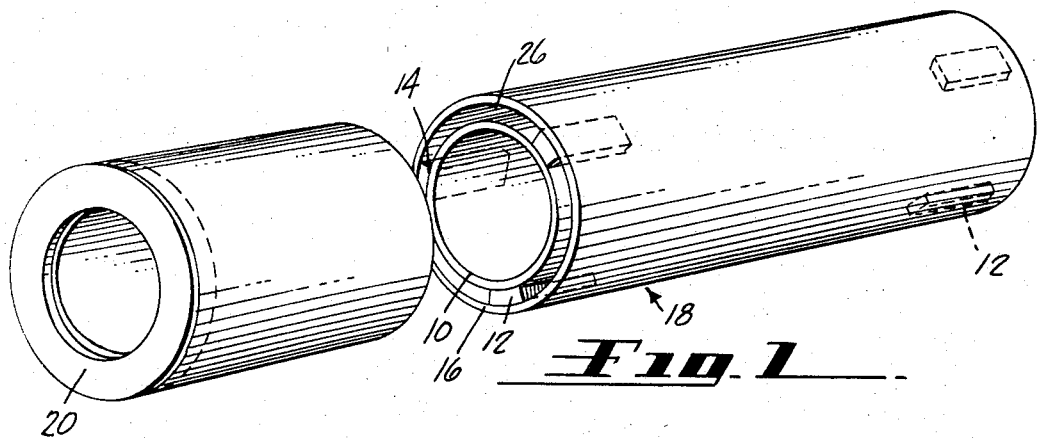
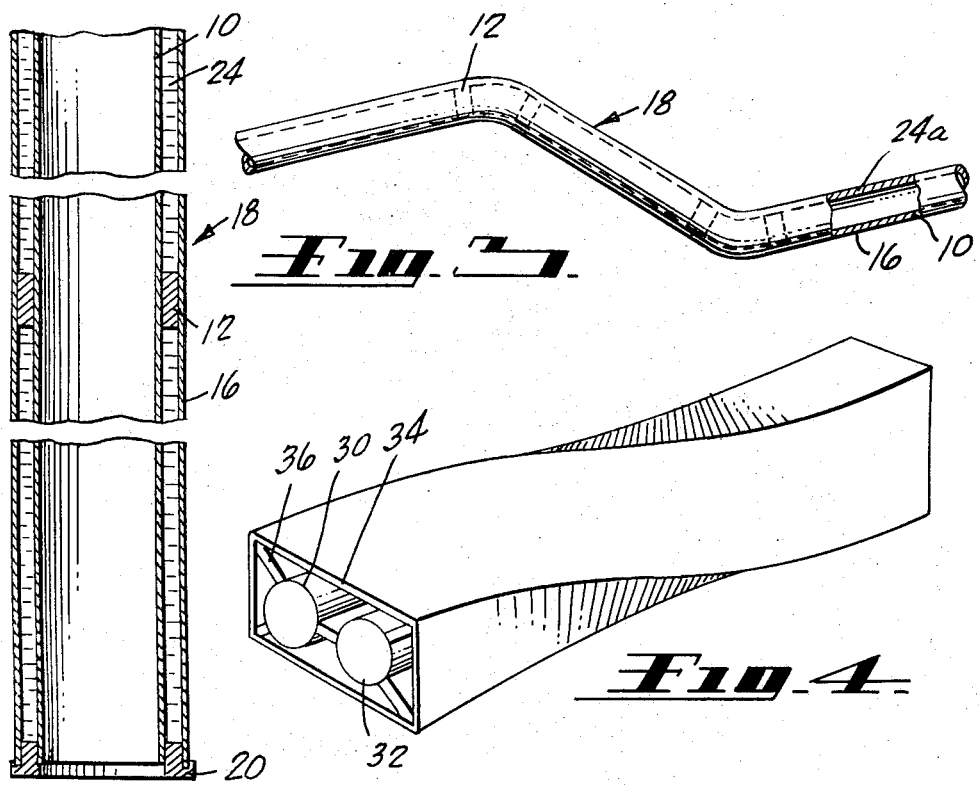
INVENTORS
CHARLES W. BERTO
RICHARD L. GOFORTH
BY
　　Leon D. Rosen
　　　　- ATTORNEY

United States Patent Office 3,343,250
Patented Sept. 26, 1967

3,343,250
MULTIPLE TUBE FORMING METHOD
Charles W. Berto and Richard L. Goforth, Long Beach, Calif., assignors to Douglas Aircraft Company, Inc., Santa Monica, Calif.
Filed Apr. 22, 1964, Ser. No. 361,688
7 Claims. (Cl. 29—423)

The present invention finds general utility in the field of composite structure forming and finds particular utility in connection with the forming of a plurality of elongated tubular structures positioned within each other or concentrically disposed.

In the tube bending and forming arts, it has long been recognized that proper bending techniques must be employed to avoid the crimping or flattening of metallic tubing during bending operations, whereby to maintain both internal and external cross-sectional integrity. In the simple bending of tubing constructed from a relatively yieldable metallic material, depending largely upon both the bend radius and arc, relatively simple tooling is required to produce normal bends without interruption in the cross-sectional shape of the tubular material. In other instances, it has been necessary to employ a filler material such as sand, a low melting point metal, an insert in the form of a spring support and the like to prevent crushing or deformation of the tubular material during the bending operation. These various substances or objects disposed in the tubing may thereafter be removed through processes well known in this art.

It has been desirable in many applications to employ two or more tubular structures that are positioned one within the other, such structures presenting little or no manufacturing problem if no bends are to be employed therein. However, in most instances where concentrically arranged tubular members must traverse a tortuous path, the provision of bends in integral tubing has presented a sufficient problem as to require avoidance of such integral structures or the resorting to complex, heavy, expensive and cumbersome structural arrangements. For example, in conduits carrying dangerous or high pressure fluids and/or in situations wherein fluids must be maintained at particular temperatures, it is common to shroud an inner conduit with an outer tube that is spaced therefrom and sometimes provided with an insulating material in the space between the conduit and the outer tube. In other instances, it is desirable to employ concentrically arranged tubular structures in heat transfer devices, refrigeration systems or acoustic control apparatus such as engine mufflers. In all of these and in many other similar structures, the use of concentrically arranged tubes presents many advantages; however, considerable difficulty has been encountered in the forming of these tubes. Inasmuch as there has been no apparent solution to the problems presented in simultaneous concentric tube forming, when such tubes must follow other than a straight line, it has been the practice heretofore to bend an internal tube in one of the usual manners and to surround this tube thereafter with a second tube that is wrapped thereabout and longitudinally welded or formed in halves, the halves being welded or otherwise secured together, with the outer tubes being limited in lengths and bends or otherwise provided with complex fittings to produce the desired concentric tubular arrangement. Naturally, such structures have been very expensive, time consuming in the manufacture thereof, extremely cumbersome and heavy, as well as being not only unattractive, but requiring considerable installational space.

Prior attempts at forming initially concentrically arranged tubing have resulted in the collapsing or otherwise unavoidable and undesired deformation of the outer, inner, or all of the tubes, inasmuch as known internal supporting materials, devices, and objects, as well as conventional tube bending methods, all presented additional problems. It is clear, when bending such concentrically arranged tubing, that the bend radii for each of the tubes are different and, not only has the concentric relationship in the area of the bends been difficult to maintain, but also the before-mentioned crushing has been encountered. The present invention, however, enables the bending of concentric tubing in a manner to maintain the concentric relationship throughout the lengths thereof and providing a finished structure that is devoid of interruptions in the cross-sectional configuration of any of the tubes.

It is therefore one important object of the present invention to provide a tube forming method that enables the forming of a plurality of tubes, positioned one within the other.

Another object of the present invention is to provide a method of bending concentric tubes.

Still another object of the present invention is to provide at least two concentric tubes firmly supported within each other, and forming in the void therebetween, a continuous passsageway etxending along the length of the tubes.

Yet another object of the present invention is to provide a method of bending shrouded tubes in which collapse of the shrouding is prevented.

A further object of the present invention is to bend concentric tubes so that the inner tube is held away from the outer tube and yet can move longitudinally of the outer tube while the tube assembly is bent.

According to one embodiment of the present invention, a straight length of inner tubing is fitted wtih spacers which are bonded thereto at predetermined locations, preferably on either side of each bend to be placed in the tubing. An outer tube or shroud is placed over the inner tube and spacers. A liquid-tight plug is then placed in one end of the tube assembly to prevent flow of liquid therefrom. The concentric tubes are then placed in a vertical position with the plug at the lower end, and the void between the inner and outer tubes is filled with a liquid which solidifies at room temperatures.

After the liquid solidifies, the shrouded pipe assembly is placed on a bending machine of conventional type using standard equipment and mandrels to support the inner tube, and the entire assembly is bent in a conventional manner. The inner and outer tubes are simultaneously bent without damage to either one.

Upon completion of the bending operations, the solidified material is heated until it becomes molten. The molten material may be poured out of the pipe assembly and saved for re-use.

Although the invention is especially useful for bending concentric tubes, it is useful in other forming operations, as will be related hereinafter. The present invention, both as to its organization and manner of operation, together with further objects and advantages thereof, may best be understood by reference to the following description and claims, taken in connection with the accompanying drawings, in which:

FIGURE 1 is a pictorial view of a shrouded concentric pipeline assembly before certain bending operations have been performed thereon;

FIG. 2 is a cross-sectional view of the assembly of FIG. 1 in a vertical position after having been filled with a liquid;

FIG. 3 is an elevational view, with parts broken away to show internal construction, of the tube assembly of FIG. 2 after certain bending operations have been performed thereon; and FIG. 4 is a pictorial view of two round tubes in a rectangular outer tube, the assembly having been twisted in accordance with the method of the present invention.

We refer now to FIG. 1 which shows an inner tubular member or pipeline 10 of a metal pipe material such as steel, which is fitted with spacers 12 at predetermined locations to enable the formation of bends. Each spacer 12 is a small block of material and groups of three spacers each are positioned at intervals along the pipeline 10. Preferably, the spacers are placed immediately on either side of each bend to be formed on the pipeline 10, where the bent and straight portions intersect. The spacers are bonded to the inner tube 10 by adhesive 14. An outer tubular member or shroud 16 is slid upon the spacers 12 concentrically therewith to encompass the pipeline 10.

The described assembly forms a shrouded pipeline assembly hereinafter referred to generally by the numeral 18. A torus shaped plug 20 is placed in the end of assembly 18 so as to seal the void 26 between the inner and outer tubes. The plug 20 serves not only to seal in fluid, but also as a spacer to maintain concentricity.

The tube assembly 18 may then be placed in a vertical position with the plug 20 at its lower end, as shown in FIG. 2. A filler material 24, preferably polyethylene glycol, which is molten at elevated temperatures and crystalline at normal room temperatures of approximately 70° F., is poured into the assembly 18 in the void 26 between the pipeline 10 and the shroud 16.

After the material 24 solidifies into the solid 24a shown in FIG. 3, the assembly 18 is bent as a unit, employing conventional methods and using standard equipment and mandrels to support the pipeline 10, into any suitable configuration, such as that shown in FIG. 3. If polyethylene glycol is used, it will solidify into crystals 24a which are soluble in hot water. The crystals may be flushed out of assembly 18 with water after the bending operation or they may be melted out, saved and re-used. The spacers 12 are generally left in position, and they serve to hold the pipeline in position.

In actual practice, a 1½" O.D. x 0.035" wall, 347 stainless steel inside fuel pipe was fitted with ⁵⁄₁₆" x ⅜" x 1½" Micarta spacer blocks. The blocks were bonded to the inside pipe and a 2" O.D. x 0.035" wall, 6061-0 aluminum outside shroud was slid over the inside pipe and spacer assembly. Number E4000 Dow Chemical Company polyglycol crystals were melted at approximately 150° F. and poured into the void between the inner pipe and the shroud.

Forming was done on a number 2 Pines tube bender using a standard 2" O.D. x 4" radius block, grip block, and follower and wiper dies.

In developing the method of this invention, various substances were used to fill the void between the shroud and pipeline, including sand, water (frozen to ice for the bending operation), and lead. However, none of the foregoing was found satisfactory. Polyethylene glycol, however, was found to give very good results.

Polyethylene glycol has an alcohol base and thus, good lubricating qualities or slickness to permit sliding of the shroud over the spacers. It is sufficiently hard to resist the effects of bending, yet ductile enough to form with the bending of the tubing. Its melting temperature of 130° F. and solidification at room temperatures makes it easy to use. Its water solubility allows it to be removed with great ease, although it may be reheated for removal. Other materials which are pliable and slick when hardened may be used in place of polyglycol.

Although the invention is especially useful for bending two concentric tubes, it may be used in other applications where an assembly of tubes must be formed simultaneously. Thus rectangular or odd-shaped tubes may be used instead of round tubes, the assembly may comprise more than two tubes, and the forming may comprise twisting or other operations instead of just bending. For example, FIG. 4 shows two round tubes 30 and 32 inside a rectangular tube 34 which is twisted by 90°. The tubes are maintained in a spaced relationship by spacers 36.

The twisting of the tube assembly is accomplished by bonding the spacers 36 to the inner tubes 30 and 32 and placing the inner tubes within the outer, rectangular tube 34. Then one end of the assembly is plugged and a molten material such as polyethylene glycol is poured into the void between the tubes 30 and 32 and the outer tube 34. The molten material is allowed to solidify and the outer tube is twisted. The material in the void forces the inner tubes 30 and 32 to follow the twist of the outer tube. The tube assembly may then be heated to melt the material in the void, which is then poured out.

While particular embodiments of the tube bending method have been shown and described herein it is to be understood that these particular embodiments are merely illustrative of the invention and that no limitations are intended to the details of construction, design or method steps herein shown and described other than as defined in the appended claims.

We claim:

1. A method of simultaneously bending a pipeline and shroud assembly comprising the steps of:
   attaching spacers to a substantially straight length of said pipeline;
   encompassing said spacers and said pipeline with said shroud in spaced relation forming a void therebetween;
   filling said void with a liquid, solidifiable substance;
   allowing said substance to solidify; and
   simultaneously bending said outer shroud and said pipeline into a predetermined shape.

2. The method of claim 1 wherein said substance is pliable and slick when solidified, whereby said spacers are lubricated during said bending and said solidified substance is easily bent.

3. The method of claim 2 wherein said substance comprises polyethylene glycol.

4. The method of claim 1 wherein said spacers are positioned immediately before and after locations where bends in said pipeline are to be made.

5. The method of claim 1 wherein said spacers comprise blocks, each subtending substantially less than one-third of the distance about said pipeline and wherein three of said blocks are provided at uniformly spaced location around said pipeline on either side of portions said pipeline to be bent.

6. A method of forming concentric tubing with bends comprising:
   attaching spacers to the outside of a first cylindrical pipe at locations along said pipe which lie on either side of bends to be formed therein;
   disposing a second cylindrical pipe about said first pipe and in concentric relationship therewith;
   plugging the void between said first and second pipes at one end thereof;
   pouring a molten material through the unplugged end of said void;
   allowing said material to solidfy;
   forming at least one bend in said pipe assembly between two of said spacers;
   heating said pipeline until said material melts;
   pouring out said material.

7. A method of forming a concentric tubing with bends comprising:
   adhesively bonding groups of at least three spacer blocks each to the outside surface of a first cylindrical pipe, said spacer blocks in each group spaced uniformly about said pipe so as to leave gaps between themselves to enable the flow of a liquid material, and said groups of spacers positioned on either side of portions of said first pipe which are to be bent;
   sliding a second cylindrical pipe over said first pipe so as to form a concentric pipe assembly;

inserting a plug into said pipes so as to seal one end of the void between said first and second pipes;

positioning said pipe assembly at least partially vertically with said plugged end of said pipe assembly lowermost;

pouring liquid polyethylene glycol into said void from the end of said pipe assembly opposite said plugged end;

allowing said polyethylene glycol to solidify;

bending said pipe assembly at locations positioned between said groups of spacer blocks;

heating said pipe assembly to a temperature above the melting point of said polyethylene glycol; and pouring out said polyethylene glycol.

References Cited
UNITED STATES PATENTS

| | | | |
|---|---|---|---|
| 485,526 | 11/1892 | Best | 29—455 X |
| 2,988,809 | 6/1961 | Hall | 29—423 |
| 3,044,160 | 7/1962 | Jaffee | 29—423 |
| 3,253,326 | 5/1966 | Henry et al. | 29—157.3 |

JOHN F. CAMPBELL, *Primary Examiner.*

THOMAS H. EAGER, *Examiner.*